HARRIET H. MAY.

Bustles.

No. 5,416. Reissued May 20, 1873.

WITNESSES:
Jas. L. Ewin
Walter Allen

INVENTOR:
Harriet H. May,
By Knight Bros Attorneys.

AM. PHOTO-LITHOGRAPHIC CO. N.Y. (OSBORNE'S PROCESS.)

UNITED STATES PATENT OFFICE.

HARRIET H. MAY, OF BIRMINGHAM, CONNECTICUT.

IMPROVEMENT IN BUSTLES.

Specification forming part of Letters Patent No. 128,412, dated June 25, 1872; reissue No. 5,416, dated May 20, 1873; application filed April 21, 1873.

*To all whom it may concern:*

Be it known that I, HARRIET H. MAY, of Birmingham, in the county of New Haven and State of Connecticut, have invented certain Improvements in Bustles, of which the following is a specification:

*Nature and Object of the Invention.*

My improved bustle is constructed with springs acting directly outward from the person, to throw out the exterior of the bustle. These springs are attached to an under web resting against the person and serving to retain the springs in proper position, and to an outer web which is so cut and constructed as to have the required convex form. The invention further consists in the provision of transverse springs inclosed in pockets, and applied and secured substantially as hereinafter described.

*General Description.*

Figure 1:
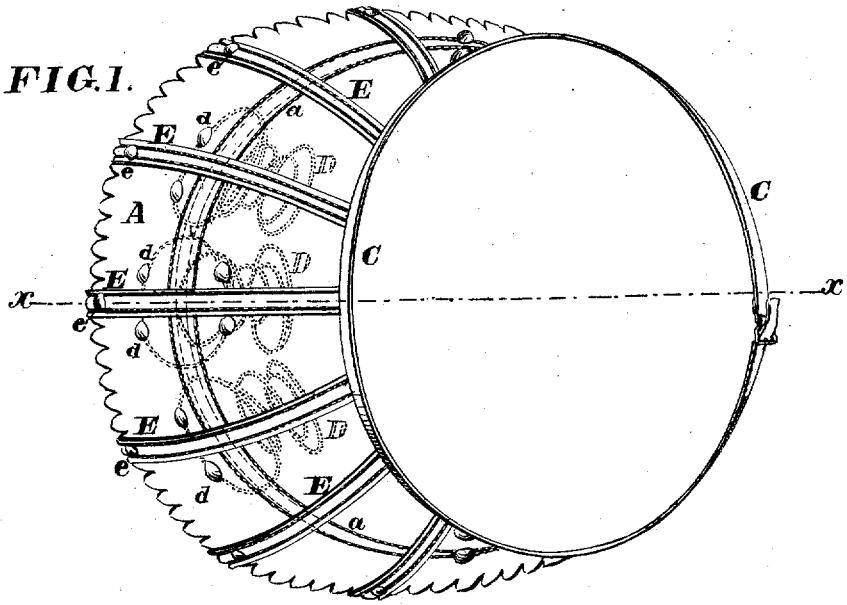
Figure 1 is a plan or top view of my improved bustle.
Figure 2:
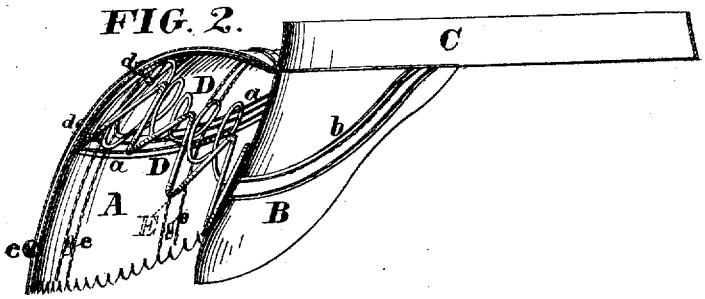
Fig. 2 is a vertical section of the same on the line *x x*, Fig. 1.
Figure 3:
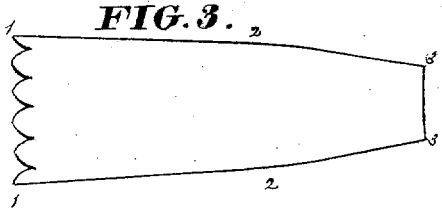
Fig. 3 is a diagram or plan of one of the sections of which the outer web is formed.

My bustle consists essentially of two webs, A B, attached to a common waistband, C, and separated by any necessary number of radial springs, D D, attached at their ends to the respective webs by fastenings *d*, and serving to press the upper or exterior web A directly outward from the interior or base B, which latter rests directly upon the person of the wearer, and is strengthened or stiffened by one or more ribs, *b*, either with or without metallic or other springs. A circumferential spring, *a*, is also applied to the web A to preserve its symmetry. In addition to this, I employ a series of vertical springs, E E, contained within pockets upon the web A, in the manner shown in Fig. 1, rivets or other equivalent fastenings being employed to secure them, as shown at *e e*. In order to impart to the outer web A the particular convexity represented in Fig. 2—that is to say, springing upward from the waistband and thence bending over in a graceful curve—I form the said web in sections of substantially the form shown in Fig. 3, tapering gradually from the wide end to a point at or beyond the said length, and thence tapering more rapidly to the narrow end. This distinguishes my bustle in the form of its outer web from bustles in common use, in which the outer web descends with a regular curvature from the outer web. To preserve the symmetry and effectiveness of the device, the radial springs D D are preferably arranged to bear outward against the vertical springs E E near the center of the latter.

*Claims.*

The following is claimed as new:

1. The under web B employed for the attachment of the springs D, and to retain them in proper position, as described and shown.
2. The springs D combined with the webs A and B, in manner substantially as and for the purpose set forth.
3. The convex outer web A, formed as herein described, of sections cut with a gradual taper from the wide end to a point at or beyond the midlength and from thence tapering more rapidly to the narrow end, for the object specified.
4. The vertical springs E applied within pockets in the web A and receiving the outward pressure of spring D, substantially as set forth.
5. The combination of the inner web B, the convex outer web A, and the springs D, substantially as set forth.

HARRIET H. MAY.

Witnesses:
ROBERT B. MAY,
L. M. GARDNER.